Feb. 18, 1941.  E. W. BRIDGE  2,232,311
BREAD TRIMMING MACHINE
Filed Oct. 6, 1939  3 Sheets-Sheet 1

Inventor
Edward W. Bridge
By Dieterich & Rutley
Attorneys.

Feb. 18, 1941.   E. W. BRIDGE   2,232,311
BREAD TRIMMING MACHINE
Filed Oct. 6, 1939   3 Sheets-Sheet 2
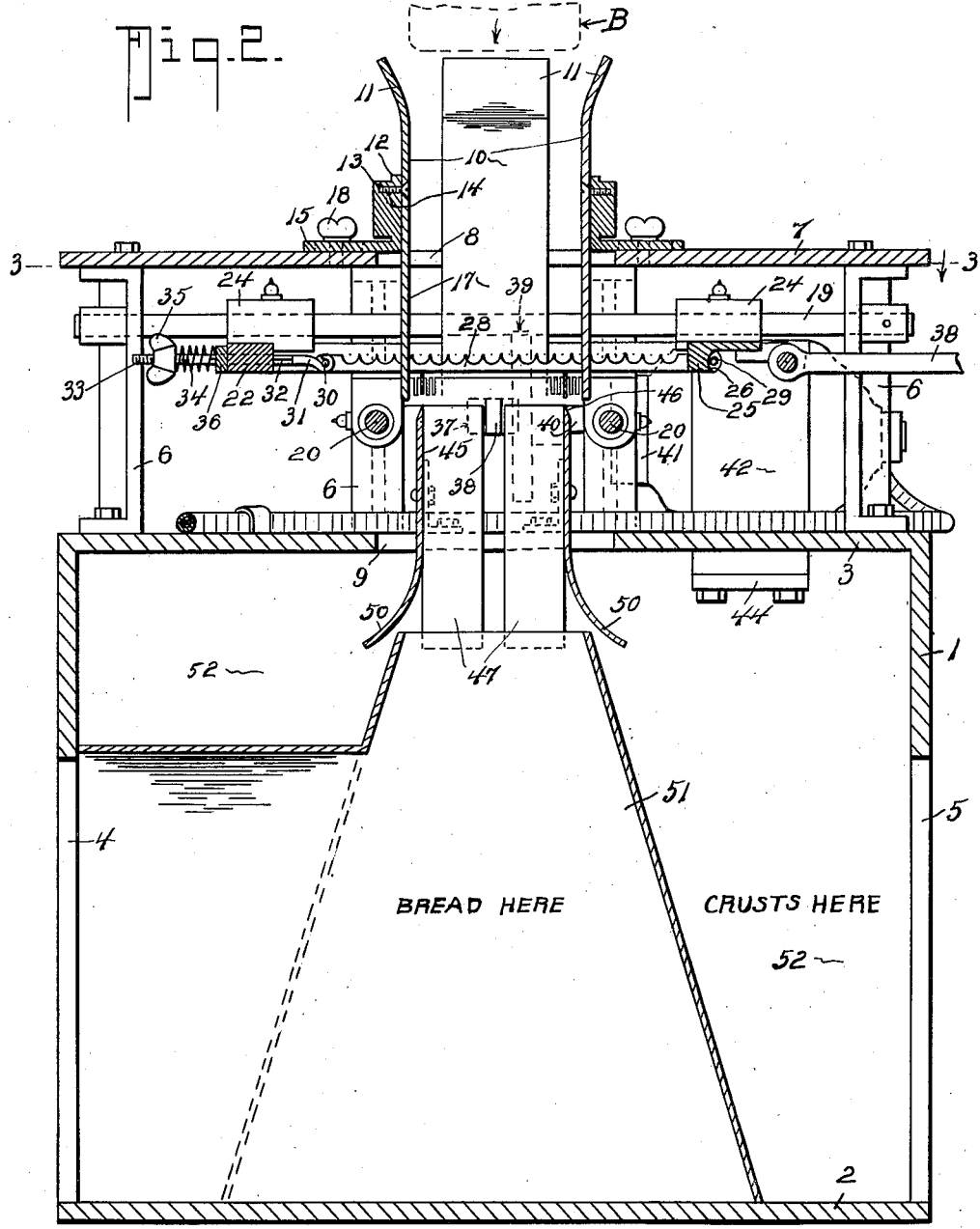
Inventor
Edward W. Bridge
By Dieterich & Rutley
Attorneys

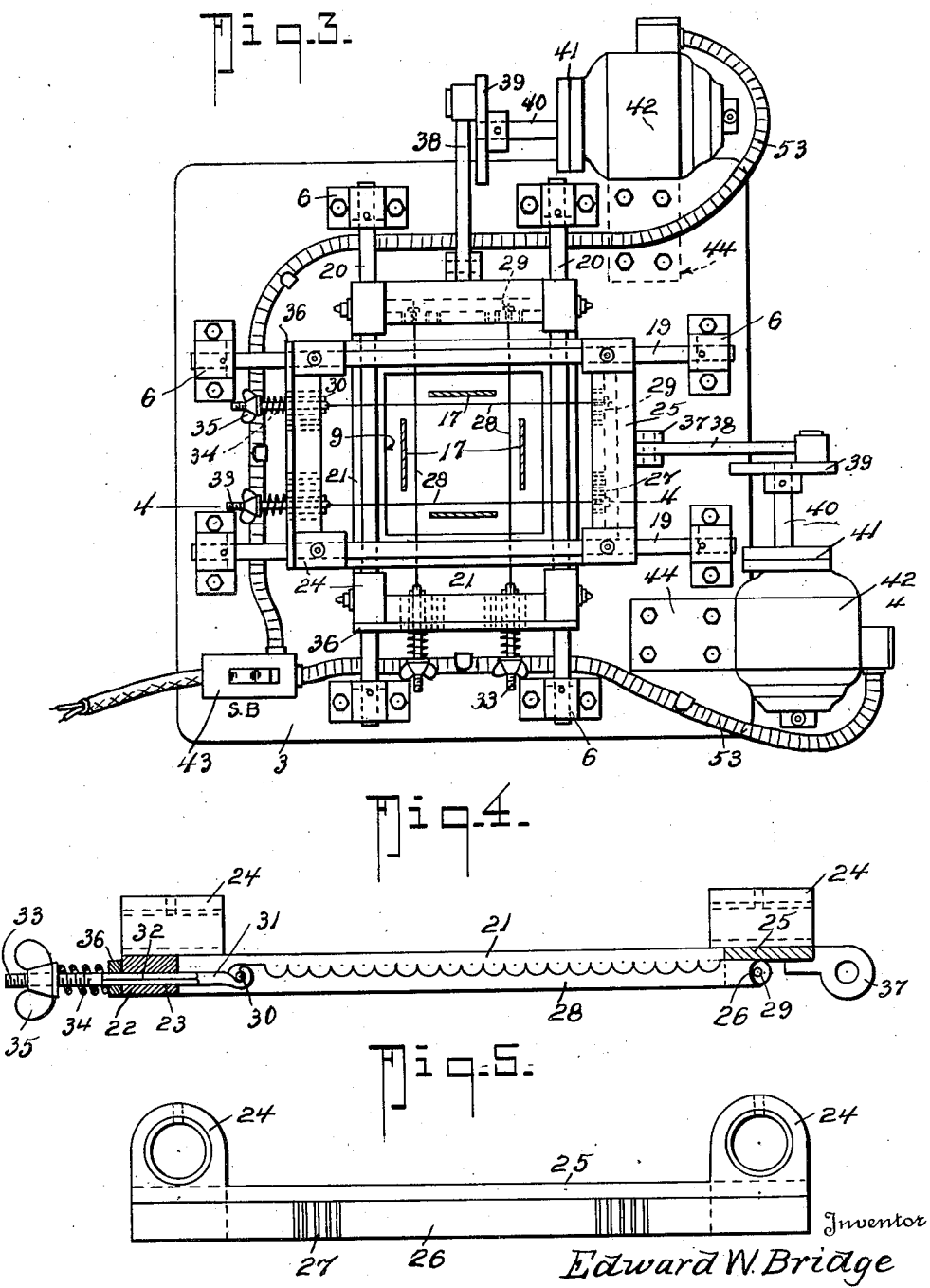

Patented Feb. 18, 1941

2,232,311

UNITED STATES PATENT OFFICE 2,232,311

BREAD TRIMMING MACHINE

Edward W. Bridge, Philadelphia, Pa.

Application October 6, 1939, Serial No. 298,327

18 Claims. (Cl. 146—78)

My invention relates to means for cutting the crusts from loaves of bread to leave sandwich loaves, and it particularly has for its object to provide a machine whose knives reciprocate in vertical planes along horizontally disposed axes, while the loaves gravitate to the knives.

Further, it is an object to provide a machine which can operate at high speed, one in which the position of the knives can be readily changed to suit different sizes of loaves, one in which thin bladed knives can be kept under tension and held against twisting while in use, and one in which—if desired—the trimmings may be kept separated from the trimmed loaves.

Other objects of the invention will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which:

Fig. 2 is a vertical section on the line 2—2 of Fig. 1.

Fig. 3 is a horizontal section on the line 3—3 of Fig. 2.

Fig. 4 is an enlarged detail longitudinal section of one of the knife frames and blade.

Fig. 5 is an enlarged end view of the same, the blade being omitted.

Fig. 8 is a detail horizontal section showing how the guides 47 are adjustably carried by the guides 45.

Figure 1:
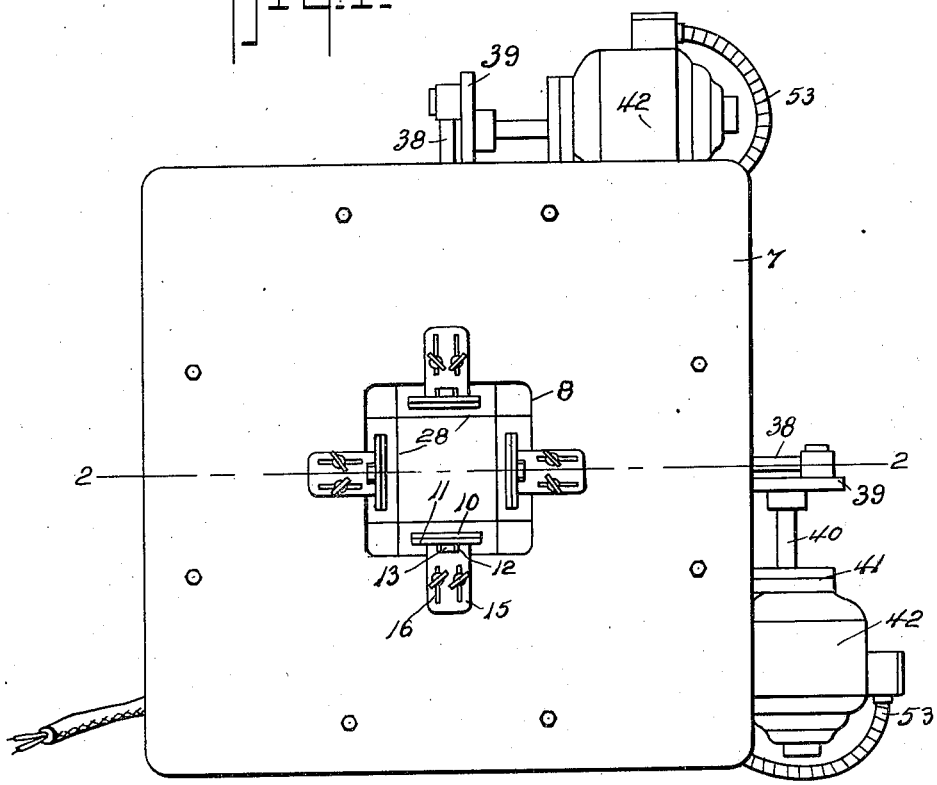
Fig. 1 is a top plan view of a preferred embodiment of my invention.
Figure 6:
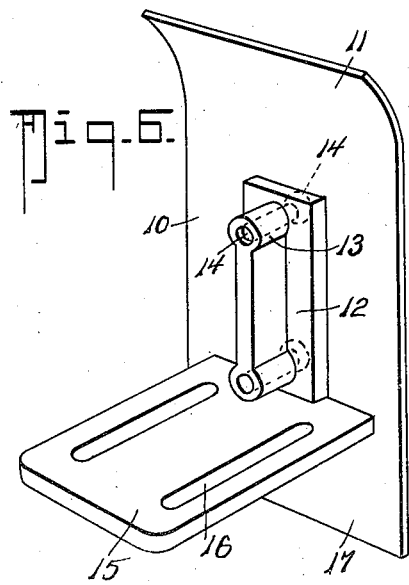
Fig. 6 is a detail perspective view of one of the upper loaf guides.
Figure 7:
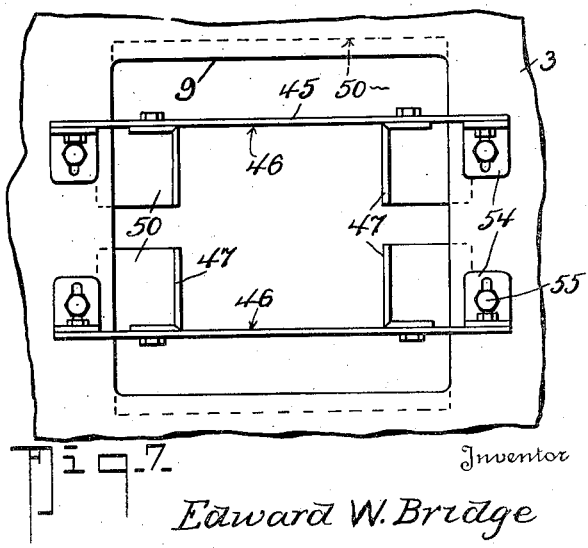
Fig. 7 is an enlarged plan of the lower loaf and trimming guides.

In the drawings, in which like numbers and letters of reference indicate like parts in all the figures, 1 is the cabinet into which the trimmed loaves and the crusts are deposited. The cabinet comprises a bottom or base 2 and a top 3, as well as side walls, in which may be provided suitable openings 4—5 through which the trimmed loaves and trimmings may be taken out.

Upon the top 3 of the cabinet is mounted a set of eight standards or brackets 6 for supporting the table 7. The table 7 and top 3 have openings 8 and 9, respectively, in vertical alignment through which the untrimmed loaves, and trimmed loaves and trimmings, respectively, pass.

Adjustably mounted on the table 7 are brackets 12 having screw-receiving members 13 to which upper loaf guides 10 are secured by countersunk-head screws 14. The brackets 12 have bases 15 slotted at 16 and adjustably held to the table 7 by thumb screws 18. The upper extremities of the plates 10 are curved, bent or flared outwardly as at 11 to facilitate entrance of a loaf of bread B (Fig. 2), and their lower extremities 17 extend down through the table opening 8 and terminate adjacent the lower knives 28.

Immovably mounted in the brackets or standards 6 are two sets of guide rods 19 and 20 respectively. The rods of one set lie above those of the other set and cross the same at 90°. (See Figs. 2 and 3.)

Slidably mounted on each pair of guide rods 19 and 20 is a knife-carrying frame 21 which is composed of four bearings 24, side bars and end cross bars. The cross bar 22 at one end of each frame has a series of square holes 23 to receive the squared shanks 32 of the blade hooks 31. The cross bar 25 at the other end of each frame has a concave face or groove 26 and is slotted at 27 to receive the blades 28; cross pins 29 in the blades rest in the groove 26, while similar pins 30 in the other ends of the blades engage with the hooks 31. The hooks 31 also pass through holes in an abutment bar 36 and have their outer ends 33 threaded to receive suitable nuts 35, tension springs 34 being located on the shanks between nuts 35 and bar 36. The shanks being square and fitted into square holes 23 cannot turn on their axes, so they cooperate with the slots 27 to hold the blade against twisting. The cutting edges of the blades 28 lie uppermost and are preferably serrated as shown.

The knife frames have ears 37 to which pitmans 38 are pivoted, the pitmans being also connected to crank discs 39 on shafts 40 which are driven through suitable reduction gear trains in housings 41 by electric motors 42 connected by suitable conductors 53 with a switch 43 mounted on the top 3. The motors 42 are carried by suitable supports 44 projecting laterally from the cabinet and secured to the top 3.

Mounted adjustably on the top 3 is a set of four brackets 54 having slots and secured by cap screws 55 to the top 3. These brackets carry a pair of parallel lower guide plates 45 having beveled upper edges 46. Adjustably mounted on plates 45 are other guide plates 47 which lie at right angles to plates 45 and between them, being adjustably secured thereto by screw bolts 49 that pass through slots 48 (see Fig. 8).

When it is desired that the trimmed loaves be separately deposited in the cabinet, the lower portions of the guide plates 45 and 47 are outwardly flared to deflect the trimmings to the outside of the trimmed-loaf receiver 51 into the trimmings chamber 52 of the cabinet.

In using my machine, the plates 10 are spaced so that a loaf placed on end between them will slip vertically downward under the action of gravity. The knives 28 (upper and lower) are suitably spaced in their frames to cut off the crust of the loaf as it gravitates past the same, and the lower guides are properly positioned so that the trimmed loaf will pass down freely between them while the trimmings are separated and conveyed away by the plates 45 and 47.

The motors are then turned on by switch 43 and the knife frames and knives rapidly reciprocate. The loaves are placed successively end to end into the receiving space bounded by the guides 10. As the loaves gravitate down, the crust will be severed from the body of the loaves as fast as they drop down to the knives.

By projecting the guides 10 below the table 7, as at 17, to end close to the tops of the lower guides 45—47, it is possible to trim previously sliced loaves as well as solid loaves, as the guides 17 will hold the slices from moving sidewise under the influence of the reciprocating knives.

From the foregoing description, taken in connection with the accompanying drawings, it is thought the construction, operation and advantages of the invention will be clear to those skilled in the art, and I desire it to be understood that changes in the details of construction may be made without departing from the spirit of the invention and the scope of the appended claims.

What I claim is:

1. In a bread loaf trimming machine, vertically disposed upper and lower guides for the untrimmed and trimmed loaves respectively, crossed and horizontally disposed knife-carrying frames having spaced knives positioned for severing the crust only from the body of the loaf as it passes through the guides, and means to operate the frames.

2. In a bread loaf crust-trimmer, a table having an opening, a receptacle beneath the table, horizontally reciprocable knives lying in vertical planes beneath the table and located one set above the other, means to space said knives apart a predetermined distance according to the size of the loaf to be trimmed, means to reciprocate said knives, and means to feed the loaves of bread endwise by gravity through the table's opening to said knives.

3. In a bread loaf crust-trimmer, a table having an opening, a receptacle beneath the table, horizontally reciprocable knives lying in vertical planes beneath the table and located one set above the other, means to space said knives apart a predetermined distance according to the size of the loaf to be trimmed, means to reciprocate said knives, and means to feed the loaves of bread endwise through the table's opening to said knives.

4. In a bread loaf crust-trimmer, a table having an opening, a receptacle beneath the table, horizontally reciprocable knives lying in vertical planes beneath the table and located one set above the other, means to space said knives apart a predetermined distance according to the size of the loaf to be trimmed, means to reciprocate said knives, means to feed the loaves of bread endwise by gravity through the table's opening to said knives, and means to guide the trimmed loaves as they pass the knives to the receptacle.

5. In a bread loaf crust-trimmer, a table having an opening, a receptacle beneath the table, horizontally reciprocable knives lying in vertical planes beneath the table and located one set above the other, means to space said knives apart a predetermined distance according to the size of the loaf to be trimmed, means to reciprocate said knives, means to feed the loaves of bread endwise by gravity through the table's opening to said knives, and means to guide the trimmed loaves as they pass the knives to the receptacle and separately gather the trimmings and the trimmed loaves.

6. In a bread loaf trimmer, a receptacle having a top with an opening, two sets of standards mounted on said top 90° apart, guide rods carried by said standards, one set of rods lying in a horizontal plane above the other set, two knife-carrying frames having bearings, a frame being slidably mounted on each set of rods, spaced knives carried by each frame and lying in vertical planes with their cutting edges uppermost, means to reciprocate said frames in their horizontal planes, a table-top mounted on said standards and also having an opening, and a set of loaf guides adjustably mounted on said table-top and extending below the same to adjacent said knives.

7. In a bread loaf trimmer, a receptacle having a top with an opening, two sets of standards mounted on said top 90° apart, guide rods carried by said standards, one set of rods lying in a horizontal plane above the other set, two knife-carrying frames having bearings, a frame being slidably mounted on each set of rods, spaced knives carried by each frame and lying in vertical planes with their cutting edges uppermost, means to reciprocate said frames in their horizontal planes, a table-top mounted on said standards and also having an opening, a set of loaf guides adjustably mounted on said table-top and extending below the same to adjacent said knives, and means to guide the trimmed loaves from the knives through the opening in said receptacle's top.

8. In a bread loaf trimmer, a receptacle having a top with an opening, two sets of standards mounted on said top 90° apart, guide rods carried by said standards, one set of rods lying in a horizontal plane above the other set, two knife-carrying frames having bearings, a frame being slidably mounted on each set of rods, spaced knives carried by each frame and lying in vertical planes with their cutting edges uppermost, means to reciprocate said frames in their horizontal planes, a table-top mounted on said standards and also having an opening, a set of loaf guides adjustably mounted on said table-top and extending above and below the same and to adjacent the lower knives, and means below and adjacent the lower knives to receive the trimmed loaf and guide it through the opening in the receptacle's top.

9. In a bread loaf trimmer, a receptacle having a top with an opening, two sets of standards mounted on said top 90° apart, guide rods carried by said standards, one set of rods lying in a horizontal plane above the other set, two knife-carrying frames having bearings, a frame being slidably mounted on each set of rods, spaced knives carried by each frame and lying in vertical planes with their cutting edges uppermost, means to reciprocate said frames in their horizontal planes, a table-top mounted on said standards and also having an opening, and a set of loaf guides adjustably mounted on said table-top and extending below the same to adjacent said knives, said means to reciprocate including a separate driving motor for each frame and power transmitting and translating connections between said motors and the respective frames.

10. In a bread loaf trimmer, a receptacle having a top with an opening, two sets of standards mounted on said top 90° apart, guide rods carried by said standards, one set of rods lying in a horizontal plane above the other set, two knife-carrying frames having bearings, a frame being slidably mounted on each set of rods, spaced knives carried by each frame and lying in vertical planes with their cutting edges uppermost, means to reciprocate said frames in their horizontal planes, a table-top mounted on said standards and also having an opening, and a set of loaf guides adjustably mounted on said table-top and extending below the same to adjacent said knives, said means to reciprocate including a separate driving motor for each frame and power transmitting and translating connections between said motors and the respective frames and a single means for starting and stopping said motors.

11. In a bread loaf trimmer, a support including a top having an opening, standards mounted on said top, a table-top mounted on said standards and having an opening, two pairs of guide rods mounted in said standards to lie in parallel spaced horizontal planes, one set of rods crossing the other, a knife-blade carrying frame reciprocably mounted on each pair of rods, a pair of knife blades carried by each frame to lie in vertical planes with their axes horizontal, said knives having serrated cutting edges, side guide plates vertically disposed in the opening of said table-top, and adjustable brackets on the table-top for sustaining said guide plates, the lower ends of said guide plates extending below the planes of the knives, to guide the loaf and hold the lower end thereof against lateral movement due to the pull of the knives.

12. In a bread loaf trimmer, a support including a top having an opening, standards mounted on said top, a table-top mounted on said standards and having an opening, two pairs of guide rods mounted in said standards to lie in parallel spaced horizontal planes, one set of rods crossing the other, a knife-blade carrying frame reciprocably mounted on each pair of rods, a pair of knife blades carried by each frame to lie in vertical planes with their axes horizontal, side guide plates vertically disposed in the opening of said table-top, and adjustable brackets on the table-top for sustaining said guide plates, the lower ends of said guide plates extending below the planes of the knives, to guide the loaf and hold the lower end thereof against lateral movement due to the pull of the knives.

13. In a bread loaf trimmer, a support including a top having an opening, standards mounted on said top, a table-top mounted on said standards and having an opening, two pairs of guide rods mounted in said standards to lie in parallel spaced horizontal planes, one set of rods crossing the other, a knife-blade carrying frame reciprocably mounted on each pair of rods, a pair of knife blades carried by each frame to lie in vertical planes with their axes horizontal, side guide plates vertically disposed in the opening of said table-top, adjustable brackets on the table-top for sustaining said guide plates, said guide plates serving as a down-chute for the loaves of bread, and a second set of loaf guide plates beneath the knives for guiding the trimmed loaf through the top of the support.

14. In a bread loaf trimmer, a support including a top having an opening, standards mounted on said top, a table-top mounted on said standards and having an opening, two pairs of guide rods mounted in said standards to lie in parallel spaced horizontal planes, one set of rods crossing the other, a knife-blade carrying frame reciprocably mounted on each pair of rods, a pair of knife blades carried by each frame to lie in vertical planes with their axes horizontal, side guide plates vertically disposed in the opening of said table-top, adjustable brackets on the table-top for sustaining said guide plates, said guide plates serving as a down-chute for the loaves of bread, and a second set of loaf guide plates beneath the knives for guiding the trimmed loaf through the top of the support and means cooperating with said second set of guides separating the trimmings from the trimmed loaf.

15. In a bread loaf trimming machine, vertically disposed sets of upper and lower guides, the lower guides being spaced closer together than the upper guides approximately a distance equal to the thickness of the crust to be trimmed, the upper guides conforming to the untrimmed loaf and the lower guides conforming to the trimmed loaf, two knife carrying frames disposed one above the other and both disposed above the lower guides and each carrying a pair of spaced apart knives held in vertical planes, one frame having its knives extending in direction at right angles to those of the other frame, the knives of the respective pairs being spaced apart so as to trim the crust from the loaf, and means to reciprocate said frames in horizontal planes.

16. In a bread loaf trimming machine, vertically disposed sets of upper and lower guides, the lower guides being spaced closer together than the upper guides approximately a distance equal to the thickness of the crust to be trimmed, the upper guides conforming to the untrimmed loaf and the lower guides conforming to the trimmed loaf, two knife carrying frames disposed one above the other and both disposed above the lower guides and each carrying a pair of spaced apart knives held in vertical planes, one frame having its knives extending in direction at right angles to those of the other frame, the knives of the respective pairs being spaced apart so as to trim the crust from the loaf, and means to reciprocate said frames in horizontal planes, said upper guides being slotted for passage of said knives, the lower ends of said upper guides and the upper ends of said lower guides lying adjacent one another.

17. In a bread loaf trimming machine, vertically disposed sets of upper and lower guides, the lower guides being spaced closer together than the upper guides approximately a distance equal to the thickness of the crust to be trimmed, the upper guides conforming to the untrimmed loaf and the lower guides conforming to the trimmed loaf, two knife carrying frames disposed one above the other and both disposed above the lower guides and each carrying a pair of spaced apart knives held in vertical planes, one frame having its knives extending in direction at right angles to those of the other frame, the knives of the respective pairs being spaced apart so as to trim the crust from the loaf, and means to reciprocate said frames in horizontal planes, the lower extremities of said lower guides having outwardly directed crust deflecting portions, and means cooperating with said deflecting portions for separately gathering the crusts and the trimmed loaves.

18. In a bread loaf trimming machine, vertically disposed sets of upper and lower guides, the lower guides being spaced closer together than the upper guides approximately a distance equal to the thickness of the crust to be trimmed, the upper guides conforming to the untrimmed loaf and the lower guides conforming to the trimmed loaf, two knife carrying frames disposed one above the other and both disposed above the lower guides and each carrying a pair of spaced apart knives held in vertical planes, one frame having its knives extending in direction at right angles to those of the other frame, the knives of the respective pairs being spaced apart so as to trim the crust from the loaf, and means to reciprocate said frames in horizontal planes, the planes in which the knives operate lining up with the planes in which the corresponding lower guides lie.

EDWARD W. BRIDGE.